United States Patent
Bellegarda et al.

(10) Patent No.: US 6,836,760 B1
(45) Date of Patent: Dec. 28, 2004

(54) USE OF SEMANTIC INFERENCE AND CONTEXT-FREE GRAMMAR WITH SPEECH RECOGNITION SYSTEM

(75) Inventors: Jerome R. Bellegarda, Los Gatos, CA (US); Kim E. A. Silverman, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 702 days.

(21) Appl. No.: 09/675,580

(22) Filed: Sep. 29, 2000

(51) Int. Cl.[7] .............................................. G10L 15/08
(52) U.S. Cl. ...................... 704/257; 704/238; 704/245; 704/252
(58) Field of Search ................................ 704/257, 238, 704/245, 252

(56) References Cited

U.S. PATENT DOCUMENTS

| | | | | |
|---|---|---|---|---|
| 4,974,191 A | * | 11/1990 | Amirghodsi et al. | 704/8 |
| 5,642,519 A | * | 6/1997 | Martin | 704/9 |
| 5,652,897 A | | 7/1997 | Linebarger et al. | 704/4 |
| 5,774,859 A | | 6/1998 | Houser et al. | 704/275 |
| 6,023,676 A | | 2/2000 | Erell | 704/241 |

OTHER PUBLICATIONS

Jerome R. Bellagarda, J. W. Butzberger, Y–L Chow, N. B. Coccaro, and D. Naik, "A Novel Word Clustering Algorithm Based On Latent Semantic Analysis," IEEE Int. Conf. on Acoust., Speech, and Sig. Proc. 1996 ICASSP–96, May 7–10, 1996, vol. 1, pp. 172–175.*

F. Jelinek, "Self–Organized Language Modeling for Speech Recognition," in Reading in Speech Recognition, A. Waibel and K.F Lee, Eds, Morgan Kaufmann Publishers, pp. 450–506, 1990.

J.R. Bellegarda and K.E.A. Silverman, Data–Driven Semantic Inference for Unconstrained Command and Control by Voice, U.S. patent application Ser. No.: 09/183,070, filed Oct. 1998.

F. Kubala et al., "The Hub and Spoke Paradigm for CSR Evaluation", in Proc. ARPA Spoken Language Technology Workshop, Morgan Kaufmann Publishers, 6 pages, Mar. 1994.

Deerwester, S. et al. "Indexing By Latent Semantic Analysis," Journal of the American Society for information Science, vol. 41, No. 6, Sep. 1990, pp 391–407.

J. Caminero–Gil, et al., "Data–Driven Disclosure Modeling for Semantic Interpretation," Proc. IEEE ICASSP 96, vol. 1,p. 401–404.

Jerome R. Bellegarda, "A Multispan Language Modeling Framework for large Vocabulary Speech Recognition," IEEE Trans. Speech and Audio Processing, vol. 6, No. 5, p. 456–467.

* cited by examiner

Primary Examiner—Richemond Dorvil
Assistant Examiner—Donald L. Storm
(74) Attorney, Agent, or Firm—Blakely, Sokoloff, Taylor & Zafman LLP

(57) ABSTRACT

A method and apparatus to use semantic inference with speech recognition systems includes recognizing at least one spoken word, processing the spoken word using a context-free grammar, deriving an output from the context-free grammar, and translating the output to a predetermined command.

36 Claims, 11 Drawing Sheets

USE OF SEMANTIC INFERENCE AND CONTEXT-FREE GRAMMAR WITH SPEECH RECOGNITION SYSTEM

BACKGROUND OF THE INVENTION

Field of the Invention

This invention relates, in one embodiment, generally to speech recognition systems, and more particularly to using semantic inference with speech recognition systems.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Apple Computer, Inc., All Rights Reserved.

BACKGROUND

Speech recognition enables a computer system to receive voice inputs and convert them into text. The computer system receives an audio input, transforms the audio input into digital data, compares the digital data with a list of digitized waveforms corresponding to text, and converts the digital data into the text corresponding to the most closely matched digitized waveform. One application of speech recognition is voice command and control (VCC), which enables a computer user to control a computer by voice rather than by using traditional user interfaces such as a keyboard and a mouse. Advances in speech recognition technology have enhanced the performance of VCC so that a computer can accurately perform a task by recognizing a command spoken within a restricted domain of vocabulary. However, existing VCC technology has limitations that diminish the usefulness of the technology to an average computer user.

Typical VCC applications employ a context-free grammar, such as a finite state grammar, that is a compact way of representing an exhaustive list of each and every command that the application can recognize. A finite state grammar is a particular implementation of a context-free grammar. These applications compare the spoken command to the list of commands underlying the context-free grammar. Previously existing VCC applications that use a context-free grammar either reject or incorrectly recognize any utterance that is semantically accurate but syntactically out-of-grammar. This rigid framework requires the computer user to learn and memorize the specific commands that are compiled within the context-free grammar.

Semantic inference alleviates the problems associated with VCC applications that use a context-free grammar. Semantic inference is a more tolerant approach to language modeling that enables a computer to recognize commands that are out-of-grammar but semantically accurate, thereby allowing computer users to say what they mean rather than requiring them to speak from an established list of commands. Existing semantic inference systems replace a context-free grammar in a speech recognition unit with a statistical language model such as an n-gram. This substitution prevents the speech recognition unit from rejecting out-of-grammar voice inputs before the semantic classification engine has the opportunity to evaluate the voice input for semantic similarity. A statistical language model makes it possible for the speech recognition unit to transcribe, with a reasonably low error rate, whatever formulation the computer user chooses for expressing a command. A semantic classification engine then operates on the transcription to determine the desired action.

Using a statistical language model with the speech recognition unit enables the voice command and control system to accurately identify the correct command. However, there are problems associated with semantic inference systems that employ a statistical language model. Substituting a statistical language model for a context-free grammar in the speech recognition unit requires a significant change in the overall architecture of the speech recognition unit, specifically in the structure of the search module. Also, estimating the parameters of the statistical language model typically requires multiple iterations over a large training corpus of relevant text data, which may involve a large number of central processor unit (CPU) cycles. Additionally, developing and maintaining such a large corpus of text data is time-consuming and expensive. Furthermore, a speech recognition unit using a statistical language model typically requires the computer user to wear a head-mounted noise-canceling microphone and to train the system to his or her voice. Finally, n-gram statistical language models have significantly larger storage requirements than context-free grammars and lead to greater recognition runtimes.

Therefore, a method and apparatus to use semantic inference with a speech recognition system using a context-free grammar are required.

SUMMARY OF THE INVENTION

A method and apparatus to use semantic inference with speech recognition systems using a context-free grammar is described herein. According to one aspect of the invention, a method for speech recognition comprises recognizing at least one spoken word, processing the spoken word using a context-free grammar, deriving an output from the context-free grammar, and translating the output into a predetermined command.

According to one aspect of the present invention, a machine-readable medium has stored thereon a plurality of instructions that, when executed by a processor, cause the processor to recognize at least one spoken word, process the spoken word using a context-free grammar, derive an output from said context-free grammar, and translate the output into a predetermined command.

According to one aspect of the present invention, an apparatus for speech recognition includes a processing unit, a memory unit, a system bus, and at least one machine-readable medium. A speech recognition unit, a context-free grammar, and a semantic inference engine are stored in the machine-readable medium.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentations.

The present invention provides a method and apparatus to use semantic inference with a speech recognition system using a context-free grammar. A speech recognition unit receives an audio input and generates a string of words from a vocabulary stored in a context-free grammar. A semantic classification unit receives the string of words and, using a large-span semantic language model and semantic anchors created using training data, classifies the voice input as corresponding to a particular command. The semantic classification unit sends a semantic representation of the string of words to an action generation unit that generates the appropriate action.

Figure 1:
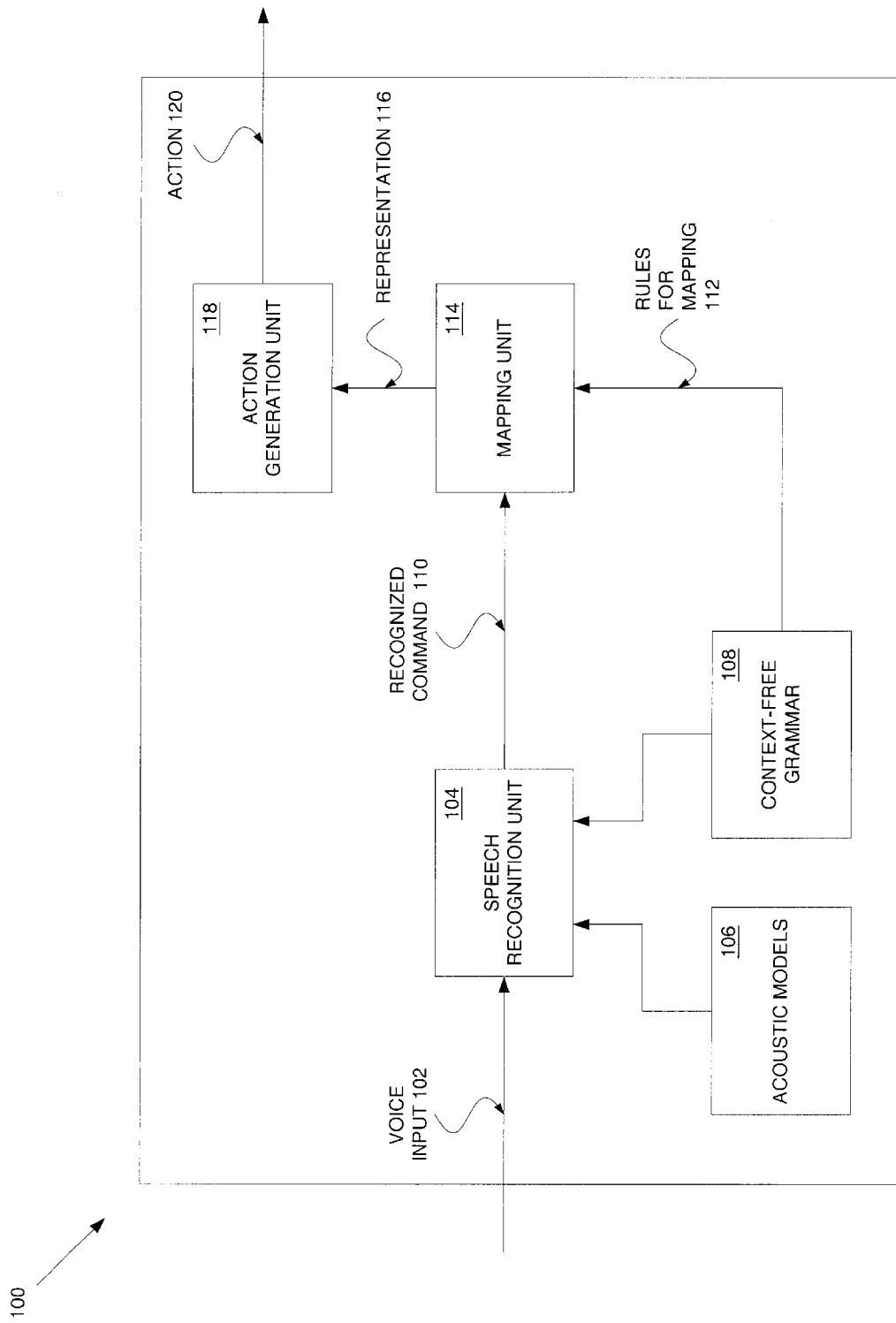
FIG. 1 is a block diagram illustrating speech recognition in a voice command and control system using a context-free grammar according to the prior art.

FIG. 1 is a block diagram illustrating speech recognition in a VCC system 100 using a context-free grammar 108 according to the prior art. A speech recognition unit 104 receives a voice input 102 and, using acoustic models 106 and a context-free grammar 108, generates a recognized command 110 from a list constructed from the context-free grammar 108. A mapping unit 114 receives the recognized command 110 from the speech recognition unit 104 as well as rules for mapping 112 from the context-free grammar 108. Using the rules for mapping 112, the mapping unit 114 maps the recognized command 110 to a list of commands and generates a representation 116 of the recognized command 110. An action generation unit 118 receives the representation 116 of the recognized command 110 and generates an action 120 corresponding to the representation 116.

Figure 2:
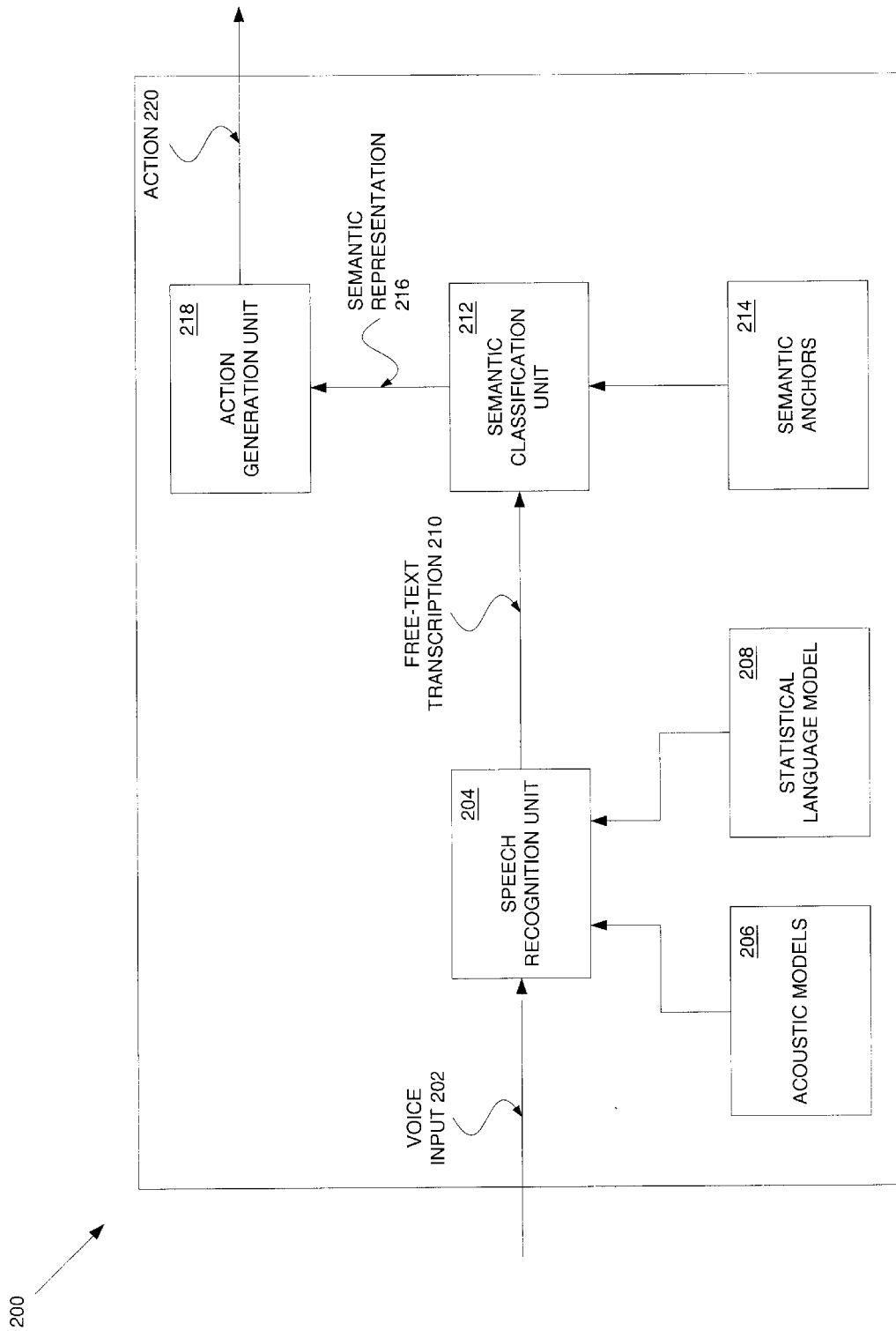
FIG. 2 is a block diagram illustrating speech recognition in a voice command and control system using semantic inference and a statistical language model according to the prior art.

FIG. 2 is a block diagram illustrating speech recognition in a VCC system 200 using semantic inference and a statistical language model 208 according to the prior art. A speech recognition unit 204 receives a voice input 202 and, using acoustic models 206 and a statistical language model 208, generates a free-text transcription 210 of the voice input 202. A semantic classification unit 212 receives the transcription 210 and determines the correlation between the transcription 210 and one or more semantic anchors 214. The semantic classification unit 214 classifies the transcription 210 as corresponding to a semantic anchor 214 and generates a semantic representation 216 of the transcription 210. An action generation unit 218 receives the semantic representation 216 and generates a corresponding action 220.

Figure 3:
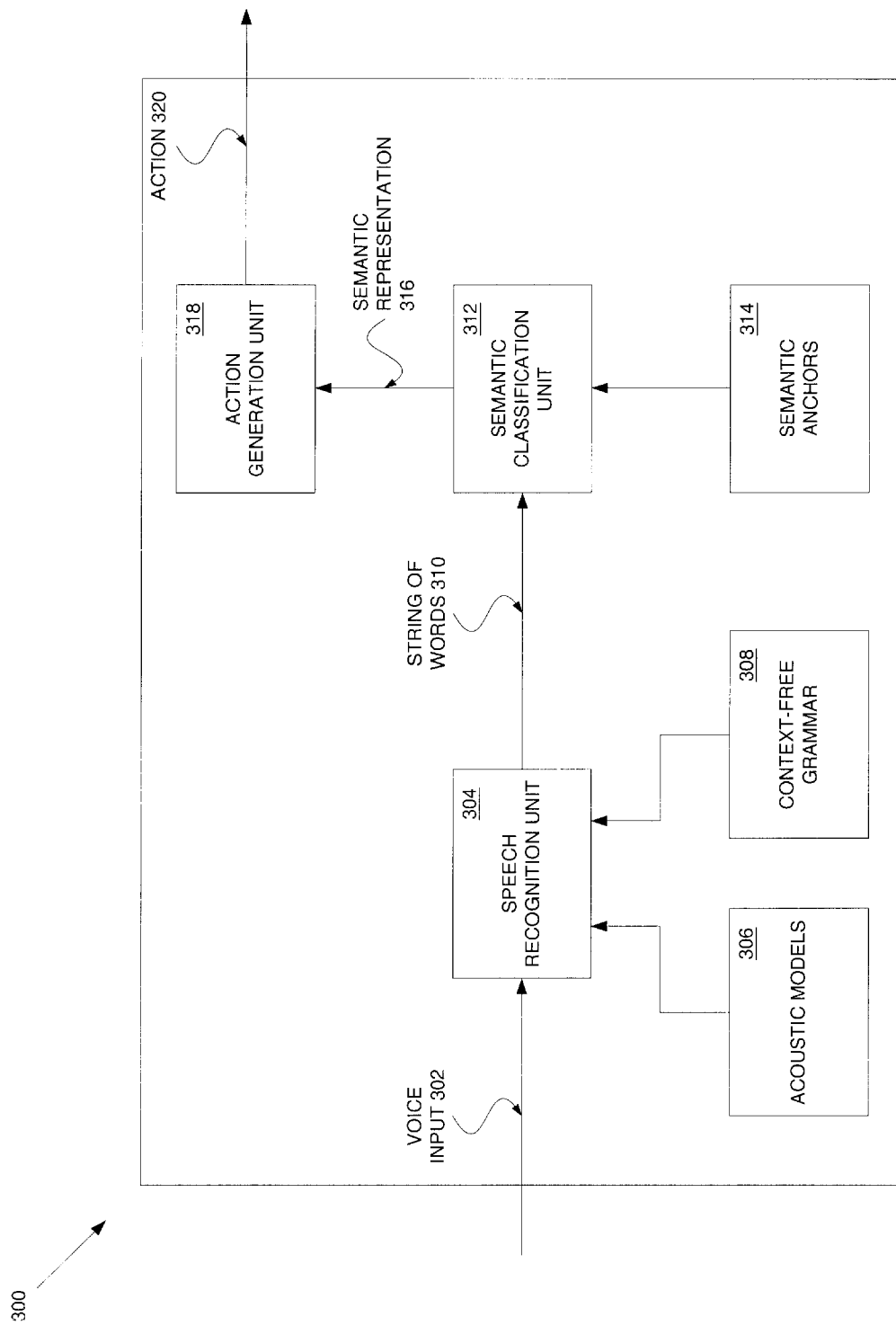
FIG. 3 is a block diagram illustrating speech recognition in a voice command and control system using semantic inference and a context-free grammar according to one embodiment of the present invention.

FIG. 3 is a block diagram illustrating speech recognition in a VCC system 300 using semantic inference and a context-free grammar 308 according to the present invention. According to one embodiment of the present invention, the context-free grammar 308 is an extended context-free grammar that generates not only recognized commands from a list of commands, but also any string of words from the list of words compiled in the context-free grammar 308. Thus, the extended context-free grammar differs from the context-free grammar 100 used in the VCC system 100 illustrated in FIG. 1 that generates only recognized commands from a list of commands.

A speech recognition unit 304 receives an voice input 302 and, using acoustic models 306 and a context-free grammar 308, generates a string of words 310 from a vocabulary stored in the context-free grammar 308. The voice input 302 is audio data that is input to the VCC system 300 and is intended to represent any type of audio data. Typically, the voice input 302 is a digitized representation of a human voice. According to one embodiment of the present invention, the acoustic models 306 are hidden Markov models. Alternate embodiments can use different types of acoustic models, and any of a variety of conventional acoustic models other than hidden Markov models can be used.

According to one embodiment of the present invention, the context-free grammar 308 comprises a vocabulary and all possible interconnections between the words in the vocabulary. According to another embodiment of the present invention, the context-free grammar 308 comprises a vocabulary and only those interconnections between the words in the vocabulary that produce strings of words 310 that are identified as syntactically correct. According to another embodiment of the present invention, the context-free grammar 308 comprises a vocabulary and all possible interconnections between the words in the vocabulary, and a vocabulary and only those interconnections produce strings of words 310 that are identified as syntactically correct. The different types of context-free grammars 308 that can be used with the present invention are discussed in more detail below.

A semantic classification unit 312 receives the string of words 310 and determines the correlation between the string of words 310 and one or more semantic anchors 314. The correlation is the distance between a vector corresponding to the string of words 310 and the vectors corresponding to the semantic anchors 314. The semantic classification unit 312 classifies the string of words 310 as corresponding to the semantic anchor 314 with the closest correlation. The semantic classification unit 312 sends a semantic representation 316 of the string of words 310 to an action generation unit 318. The action generation unit 318-receives the semantic representation 316 and generates an action 320.

According to one embodiment of the present invention, the VCC system 300 separates different strings of words 310 from one another based on detected pauses between words in the voice input 302. In this embodiment, if the VCC system 300 detects silence for greater than a threshold period of time, then the VCC system 300 interprets the silence as a pause between separate strings of words 310 corresponding to separate commands. The semantic classification unit 312 generates a separate semantic representation 316 for each separate string of words 310. Typical values for this threshold period of time range from approximately 300 milliseconds to approximately 3 seconds. In the illustrated implementation, the speech recognition unit 304 detects the pauses and indicates to the semantic classification unit 312 which strings of words 310 correspond to separate commands (e.g., by sending a signal to the semantic classification unit 312, or by grouping words of a string of words 310 together (e.g., by using a linked list)). Alternatively, other methods can be used to identify the beginning and/or ending of a string of words 310, such as a manual input from a user (e.g., selection of a particular box via a graphical user interface and a pointer).

The action generation unit 318 uses the semantic representation 316 to determine the action 320 that is to be taken in response to the voice input 302 and generates the action 320. According to one embodiment, the action generation unit 318 maintains a mapping of possible semantic representations 316 to actions 320 (e.g., system commands to display time, open files, close applications, etc.). It is to be appreciated that a wide range of commands can be supported by the VCC system 300, with the exact nature of the commands being dependent on the environment where the VCC system 300 is used. The action generation unit 318 is well known to those skilled in the art, and thus will not be discussed further except as it pertains to the present invention.

Figure 4:
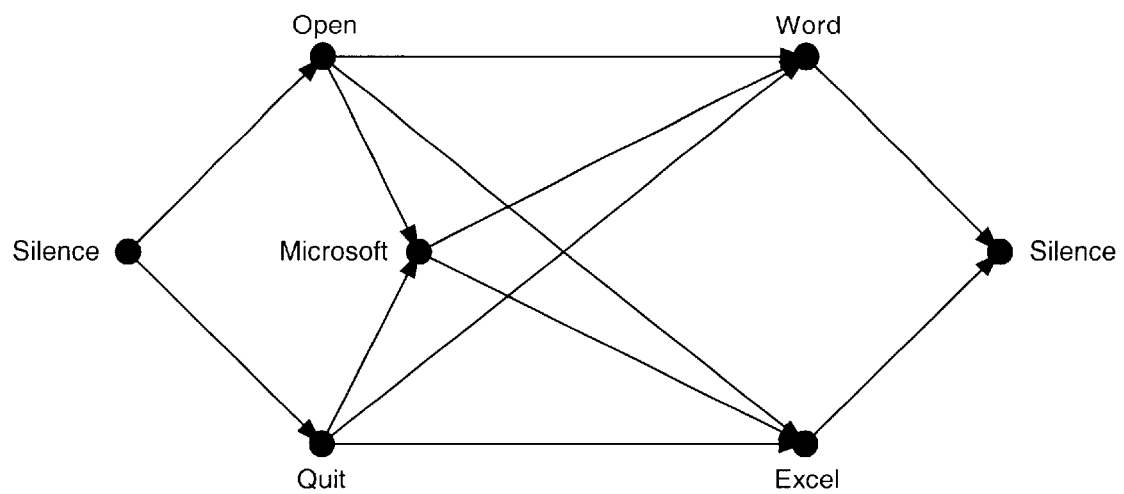
FIG. 4 is a word graph illustrating a context-free grammar according to one embodiment of the present invention.

FIG. 4 is an example of a word graph for a context-free grammar according to one embodiment of the present invention. Construction of the context-free grammar is described through explanation of the word graph. The word graph comprises a vocabulary and only those interconnections between the words in the vocabulary that produce strings of words that are identified as syntactically correct. The context-free grammar allows eight commands: (i) Open Microsoft Word; (ii) Open Word; (iii) Open Microsoft Excel; (iv) Open Excel; (v) Quit Microsoft Word; (vi) Quit Word; (vii) Quit Microsoft Excel; and, (viii) Quit Excel. Any spoken command other than one of these eight commands, such as "quit spreadsheet," is either rejected or matched to the wrong action.

Figure 5:
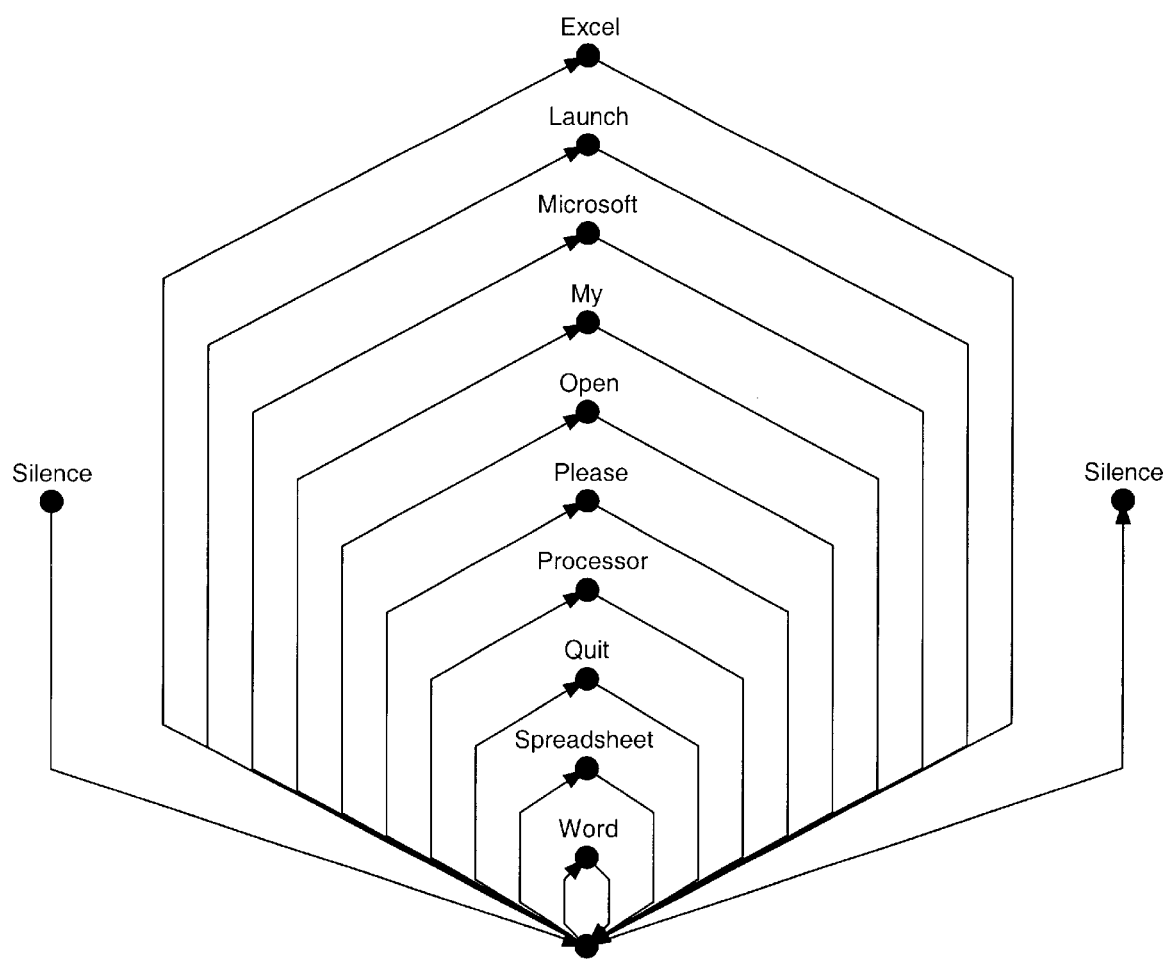
FIG. 5 is a word graph illustrating a context-free grammar according to another embodiment of the-present invention.

FIG. 5 is an example of a word graph for a context-free grammar according to another embodiment of the present invention. The context-free grammar illustrated in FIG. 5 is an extended context-free grammar because it is capable of generating any string of words from a list of words compiled in the context-free grammar, not just recognized commands from a list of commands. The word graph consists of a vocabulary and all possible interconnections between the words in the vocabulary. The word graph illustrated in FIG. 5 corresponds to the simple task of opening and quitting two computer applications. The vocabulary in the word graph illustrated in FIG. 4 consists of the following words: (a) Excel; (b) Launch; (c) Microsoft; (d) My; (e) Open; (f) Please; (g) Processor; (h) Quit; (i) Spreadsheet; and (j) Word. The context-free grammar allows every string of words comprising words from this vocabulary, such as "Launch My Word Processor" and "Quit Microsoft Spreadsheet Please." Because the context-free grammar includes all possible interconnections between the words in the vocabulary, the semantic classification unit has the opportunity to evaluate voice inputs that would have been rejected by a speech recognition unit using a typical context-free grammar that has only those interconnections that produce strings of words that are identified as syntactically correct.

According to one embodiment of the present invention, probabilities based on observed or expected frequency are assigned to each grammar arc in the context-free grammar. The greater the number of words in the vocabulary, the greater the likelihood of allowing nonsensical strings of words. For example, the grammar illustrated in FIG. 5 allows semantically improper strings of words such as "Word My Please." Assigning probabilities to each grammar arc reduces the likelihood of recognizing a nonsensical string of words.

Figure 6:
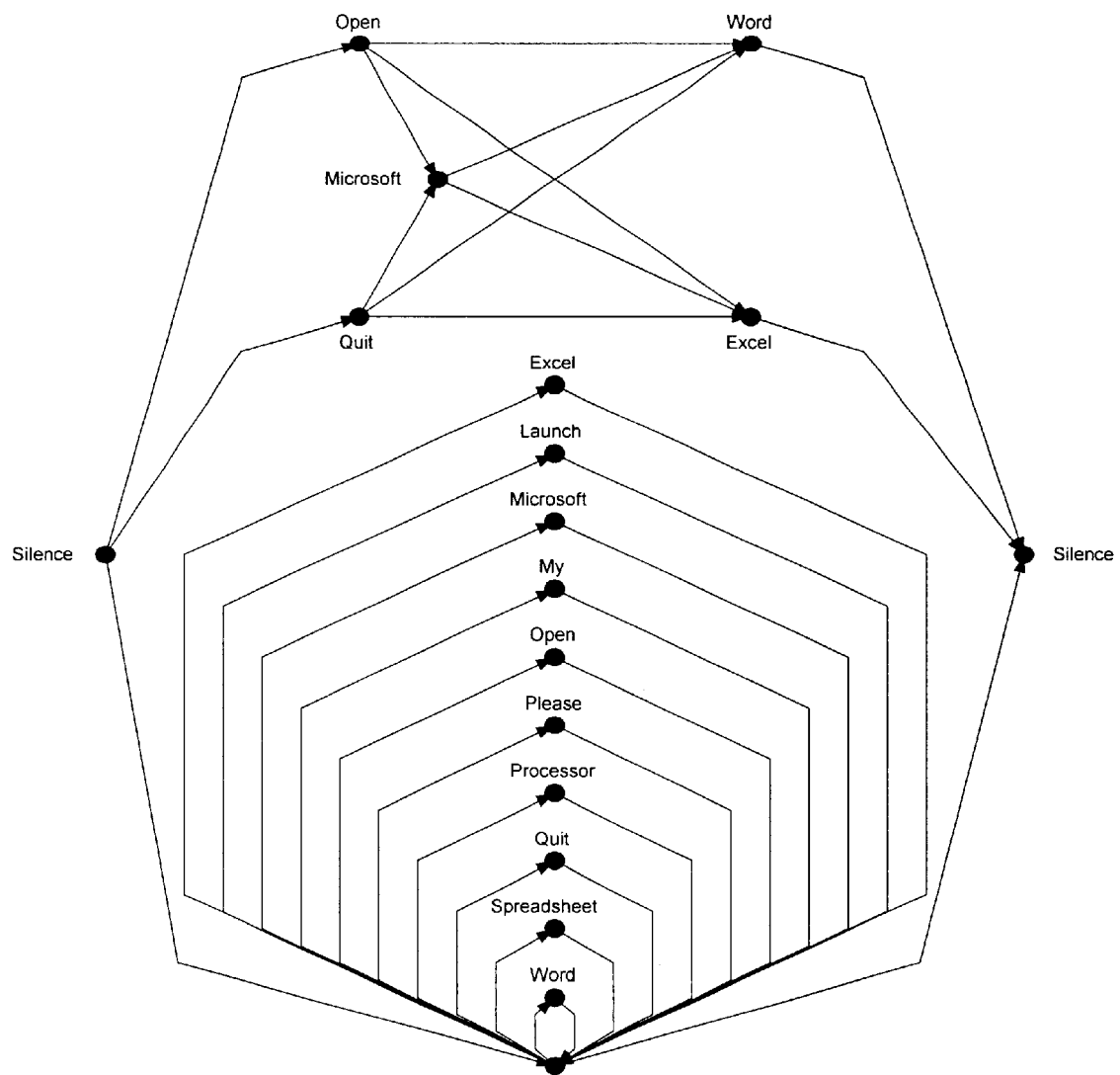
FIG. 6 is a word graph illustrating a context-free grammar according to another embodiment of the present invention.

FIG. 6 is an example of a word graph for a context-free grammar according to another embodiment of the present invention. The context-free grammar illustrated in FIG. 6 is an extended context-free grammar because it is capable of generating any string of words from a list of words compiled in the context-free grammar, not just recognized commands from a list of commands. The word graph comprises two word sub-graphs. The first word sub-graph comprises a vocabulary and only those interconnections between the words in the vocabulary that produce strings of words that are syntactically correct. The second word sub-graph comprises the underlying vocabulary from the first word sub-graph and all interconnections between the words in the vocabulary. The context-free grammar allows all eight commands allowed by the context-free grammar illustrated in FIG. 4. Furthermore, the context-free grammar allows every string of words comprising words from the underlying vocabulary.

Figure 7:
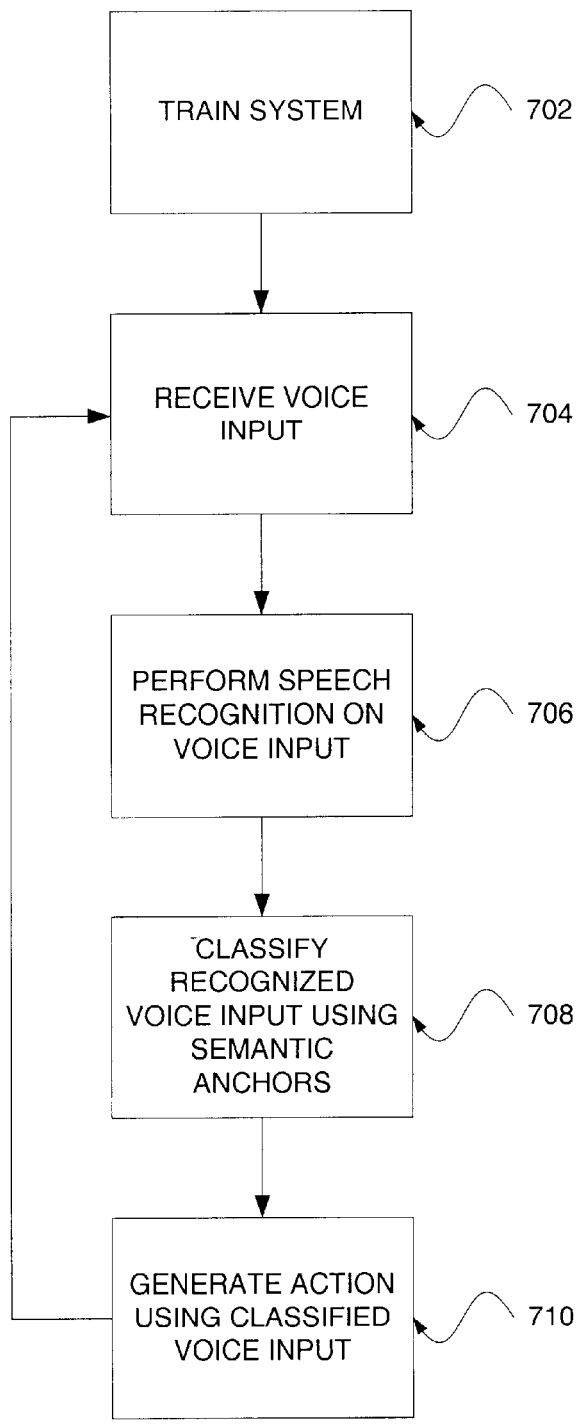
FIG. 7 is a flowchart illustrating the process followed in voice command and control according to one embodiment of the present invention.

FIG. 7 is a flowchart illustrating the process followed in performing speech recognition in a VCC system according to one embodiment of the present invention. Initially, the VCC system is trained, step 702. This training can be done by the manufacturer (e.g., entering training data when the system is built) and/or by the user (e.g., the user speaking in the training data). In the illustrated embodiment, once the VCC system is initially trained, no further training is necessary for command recognition. However, additional training may optionally be performed by a user, such as to customize the VCC system to a particular user's voice.

After the VCC system is trained, a voice input is eventually received, step 704. The voice input is then recognized by the speech recognition unit, step 706. The recognized voice input (e.g., the words of the input command) is then classified by the semantic classification unit, step 708. This classification process identifies, based on the semantic anchors, which command was actually input, and generates a semantic representation of the voice input. The semantic representation is then used by the action generator to carry out the desired action, step 710. As discussed in more detail below, the classification performed by the semantic classification unit (e.g., semantic classification unit 312 of FIG. 3) is based on the semantics or actual words that are part of the command rather than the grammar of the command.

Figure 8:
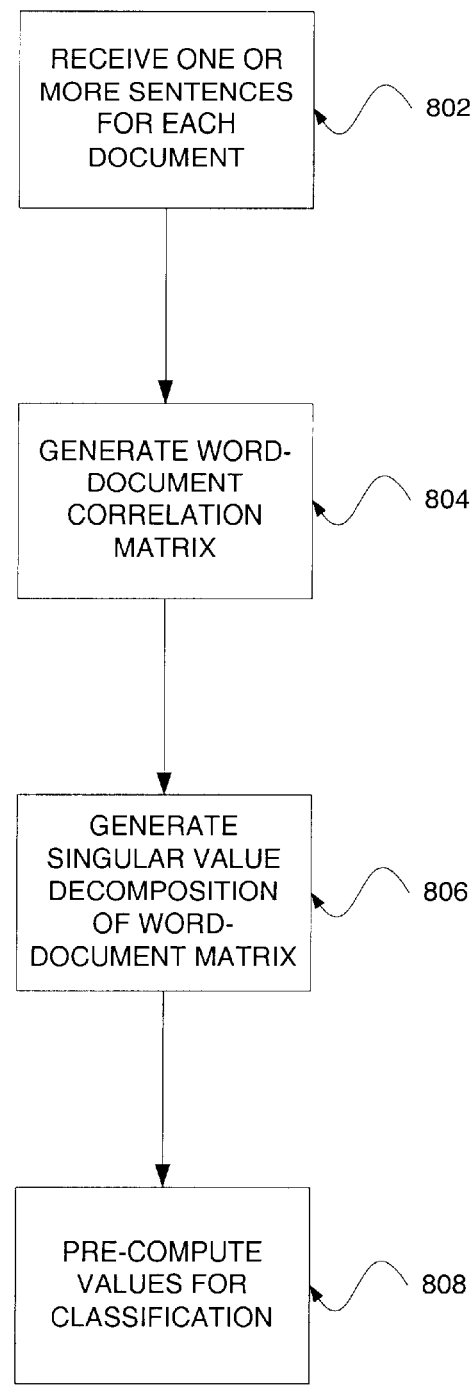
FIG. 8 is a flowchart illustrating the process of training the voice command and control system according to one embodiment of the present invention.

FIG. 8 is a flowchart illustrating the process of training the command recognition system according to one embodiment of the present invention. According to one implementation, FIG. 8 illustrates the process of step 702 of FIG. 7 in more detail. Training data is entered into the system and mapped to a vector space having a particular dimension. For ease of explanation, in the discussions to follow the training data is referred to as sentences. However, it is to be appreciated that the training data can be sentences, phrases, or other word groupings. Instances of such units associated with a particular command form what may be referred to as a "document" pertaining to that command. It will be appreciated that typically, in the context of the present invention, a document is a command. In the illustrated embodiment, the mapping is performed using a modification of a paradigm first formulated in the context of information retrieval, called latent semantic analysis, which relies on a singular value decomposition of a word-document correlation matrix.

The word-document correlation matrix tabulates the number of times each word occurs in each document. Assuming that the training database includes K documents and a total of M different words, and assuming that the words form the rows of the matrix and the documents form the columns, then each element (i,j) of the matrix indicates how many times the corresponding word $M_i$ occurs in the document $K_j$. Each document from a column of the word-document correlation matrix can be represented as a single vector containing M values, with the resulting vectors defining a mapping between the vocabulary and a vector space of dimension M. As discussed in more detail below, this mapping can be refined by performing a singular value decomposition of the word-document correlation matrix, in which case the vector space is reduced to a dimension R, where R<M.

As illustrated in FIG. 8, one or more sentences for each command document are first received, step 802. A "command document" refers to a collection of one or more sentences, phrases, or other word groupings all intended to identify the same command. For example, a command document for the command to display the current time could include the word groupings "tell me what time it is", "what time is it", "display time", etc.

The word-document correlation matrix is then generated, step 804. According to one embodiment of the present invention, the word-document correlation matrix is generated by determining the number of times each of the M words occurs in each of the K command documents. By way of example, if the command document for the command to display the current time includes the word groupings "tell me what time it is", "what time is it", and "display time", then the counts of the number of times each of the M words appear in the word-document correlation matrix for the command to display the current time are illustrated in Table I. Counts for all other words in the word-document correlation matrix for the command to display the current time are zero.

TABLE I

| Word | Count |
| --- | --- |
| display | 1 |
| is | 2 |
| it | 2 |
| me | 1 |
| tell | 1 |
| time | 3 |
| what | 2 |

A singular value decomposition of the word-document matrix having an order of decomposition of R is then generated, step 806. The value of R can vary depending on the values of M and K, and by balancing computational speed (associated with lower values of R) against accuracy (associated with higher values of R). Typical values for R range from 5 to 50. The singular value decomposition is generated according to the following calculation:

$$W=USV^T \qquad (1)$$

where U represents the M×R matrix of left singular vectors, $V^T$ represents the transposition of the K×R matrix of right singular vectors, and S represents the R×R diagonal matrix of singular values. The generation of the left and right singular vectors, as well as the diagonal matrix of singular values, is well-known to those skilled in the art and thus will not be discussed further.

Given the singular value decomposition from calculation (1), a particular document $d_j$ of W can be determined based on the jth right singular vector $v_j$ according to the following calculation:

$$d_j=USv_j^T \qquad (2)$$

Further, based on calculation (2) and using well-known mathematical functions and properties, the value of the jth right singular vector $v_j$ can be calculated according to the following:

$$v_j=d_j^T US^{-1} \qquad (3)$$

It is to be appreciated that the value $US^{-1}$ does not change for different values of j, and therefore the value $US^{-1}$ can be pre-calculated, step 808, and used during classification of input values as discussed in more detail below. This pre-calculation reduces the computation required during command classification, thereby increasing the speed of the command recognition system during operation.

Thus, from the training data a large-span semantic vector space having a dimension R is created. Each document from the training data results in a different semantic anchor within that vector space. Furthermore, each of the semantic anchors is based on the actual words of the training data rather than the grammar used in the training data. The semantic anchors are used in classifying input data as a particular command, as discussed in more detail below.

Figure 9:
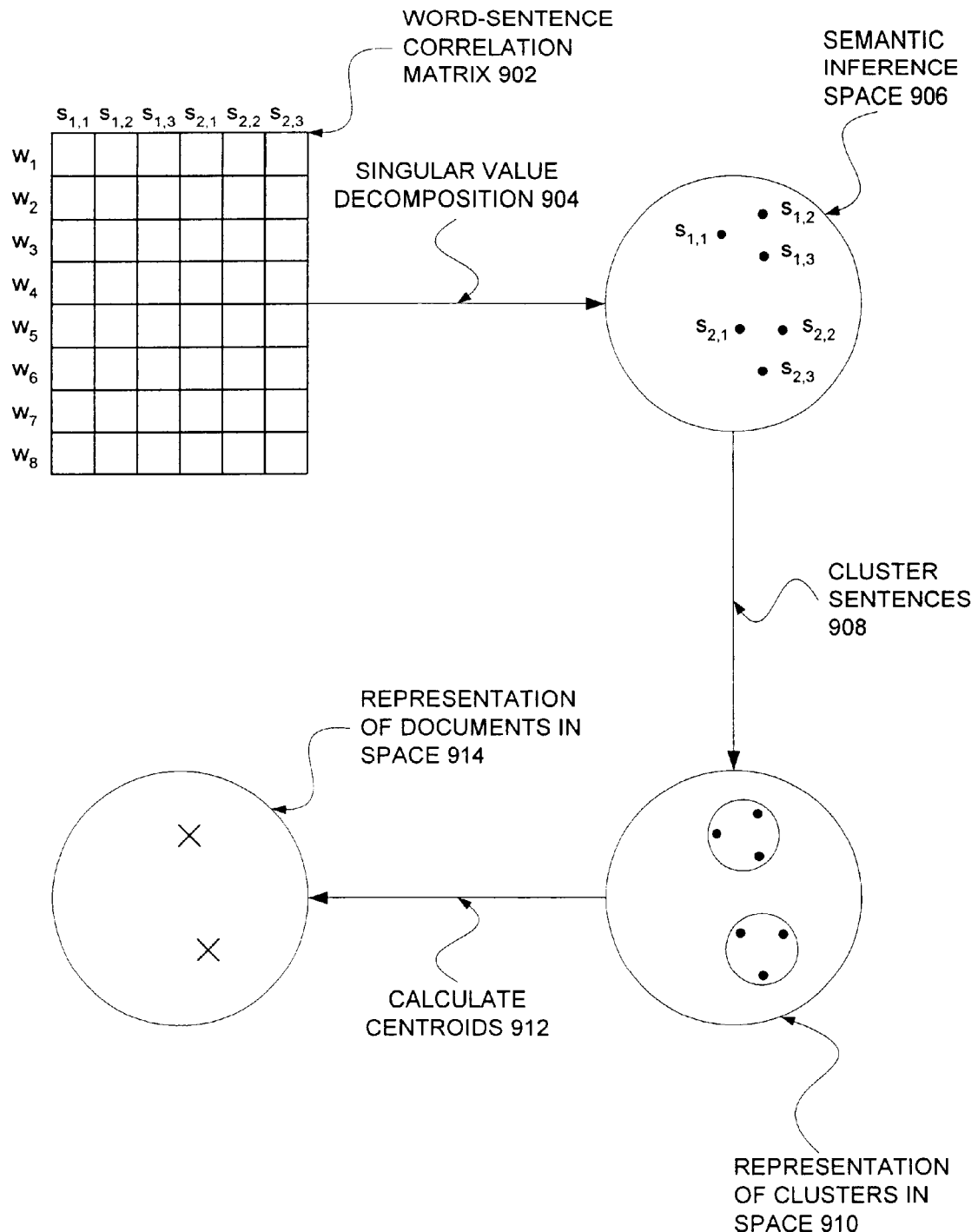
FIG. 9 is a diagram illustrating the process of training the voice command and control system according to another embodiment of the invention.

FIG. 9 is a diagram illustrating the process of training the command recognition system according to another embodiment of the present invention. One or more sentences for each document are received. A word-sentence correlation matrix 902 is generated by determining the number of times each of the words occurs in each of the sentences. By way of example, assume that the VCC system is trained for two commands. The document for the first command to display the time includes the sentences "tell me what time it is," "what time is it," and "display time." The document for the second command to display the date includes the sentences "tell me what date it is," "what date is it" and "display date." The counts of the number of times each word appears in the word-sentence matrix for these four commands are illustrated in Table II.

TABLE II

| Word | Count 1 | Count 2 | Count 3 | Count 4 | Count 5 | Count 6 |
|---|---|---|---|---|---|---|
| display | 0 | 0 | 1 | 0 | 0 | 1 |
| is | 1 | 1 | 0 | 1 | 1 | 0 |
| it | 1 | 1 | 0 | 1 | 1 | 0 |
| me | 1 | 0 | 0 | 1 | 0 | 0 |
| tell | 1 | 0 | 0 | 1 | 0 | 0 |
| time | 1 | 1 | 1 | 0 | 0 | 0 |
| what | 1 | 1 | 0 | 1 | 1 | 0 |
| date | 0 | 0 | 0 | 1 | 1 | 1 |

The first three counts in Table 2 represent the three sentences that correspond to the document for displaying the time. The second three counts in Table 2 represent the three sentences that correspond to the document for displaying the date.

As shown in FIG. 9, a singular value decomposition 904 of the word-sentence matrix 902 is then generated. The singular value decomposition 904 can be represented in a semantic inference space 906. Given the singular value decomposition 904, a particular sentence and right singular vector can be calculated. The sentences are clustered 908 according to their corresponding documents, and the clusters can be represented in the semantic inference space 910. The centroid is calculated 912 for each cluster of sentences, and the centroids can be represented in the semantic inference space 914. Each centroid represents a separate document and therefore a separate semantic anchor. The centroids are used in classifying input data as corresponding to a particular command.

Figure 10:
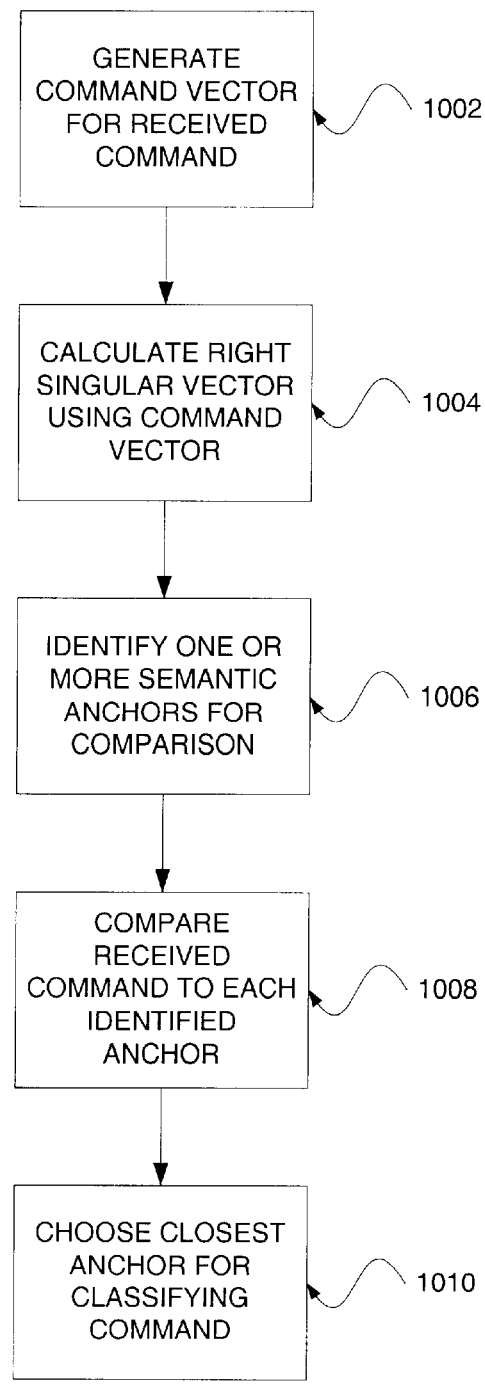
FIG. 10 is a flowchart illustrating the process of classifying voice input according to one embodiment of the present invention.

FIG. 10 is a flowchart illustrating the process followed in classifying voice input according to one embodiment of the present invention. According to one implementation, FIG. 10 illustrates the process of step 708 of FIG. 7 in more detail. As illustrated, a vector is first generated for the received command, step 1002.

When the word(s) of a new command are received from the speech recognizer, the semantic classifier creates a new command vector $d_p$ of order M that identifies the number of occurrences of each of the M words in the new data transcription, step 1002. The classifier then determines the value of the right singular vector $v_p$ corresponding to this new data transcription, step 1004, according to the following calculation (similar to calculation (3) discussed above):

$$v_p = d_p^T U S^{-1} \qquad (4)$$

As discussed above, $US^{-1}$ is pre-computed. Therefore, the only computation which occurs at this step is the matrix multiplication of $d_p^T$ by the pre-computed value $US^{-1}$. The result of calculation (4), $v_p$, is a representation of the new data transcription in the vector space R.

The classifier then identifies one or more semantic anchors to be used for comparison to the vector $v_p$, step 1006. According to one embodiment of the present invention, all of the anchors generated from the training data are used for comparison, and thus all are identified in step 1006. Alternatively, the vectors can be clustered into different groups, each including a subset of the anchors from the training data. Any of a variety of clustering algorithms, such as bottom-up clustering, can be used. Clustering algorithms are well-known to those skilled in the art, and thus will not be discussed further except as they pertain to the present invention.

The classifier then compares the representation of the new data transcription ($v_p$) to one or more of the different anchors in the vector space previously calculated from the training data, step 1008. A "distance" between the new data transcription vector and each of the one or more vectors is then determined, with the "distance" representing the similarity between the vectors. Two vectors which are similar have a small distance between one another, whereas vectors which are less similar have larger distances between one another. The classifier assigns the new data transcription vector to the training vector that is closest to the new vector, step 1010.

The distance between the new data transcription vector $v_p$ and a vector $v_j$ from the training data can be calculated in a variety of different manners. According to one embodiment of the present invention, the distance z between the new data transcription vector $v_p$ and a vector $v_j$ from the training data is determined by calculating the inverse cosine of the similarity between $v_p S$ and $v_j S$ according to the following calculation:

$$z = \cos^{-1} \frac{v_p S^2 v_j^T}{\|v_p S\| \|v_j S\|} \qquad (5)$$

According to an alternate embodiment of the present invention, the distance z between the new data transcription vector $v_p$ and one of the vectors $v_j$ from the training data is determined by calculating the Euclidean distance between the two vectors according to the following calculation:

$$z = \sqrt{\sum_{i=1}^{R} ((v_p)_i - (v_j)_i)^2} \qquad (6)$$

The comparison process in steps 1008 and 1010 can be accomplished in a variety of manners. According to another embodiment, comparisons for all of the identified anchors are made and the anchor that is most similar to the data transcription vector $v_p$ is selected. According to an alternate embodiment, as soon as an anchor that is less than a threshold distance from the data transcription vector $v_p$ is discovered, the comparison process ends and that anchor is determined to be the "closest" in step 1010.

Thus, as can be seen in FIG. 10, the classification of the input command is performed using a data-driven semantic inference. It is a representation of the words of the command that is compared to the representations of the words of the commands in the training data in order to classify the input.

Figure 11:
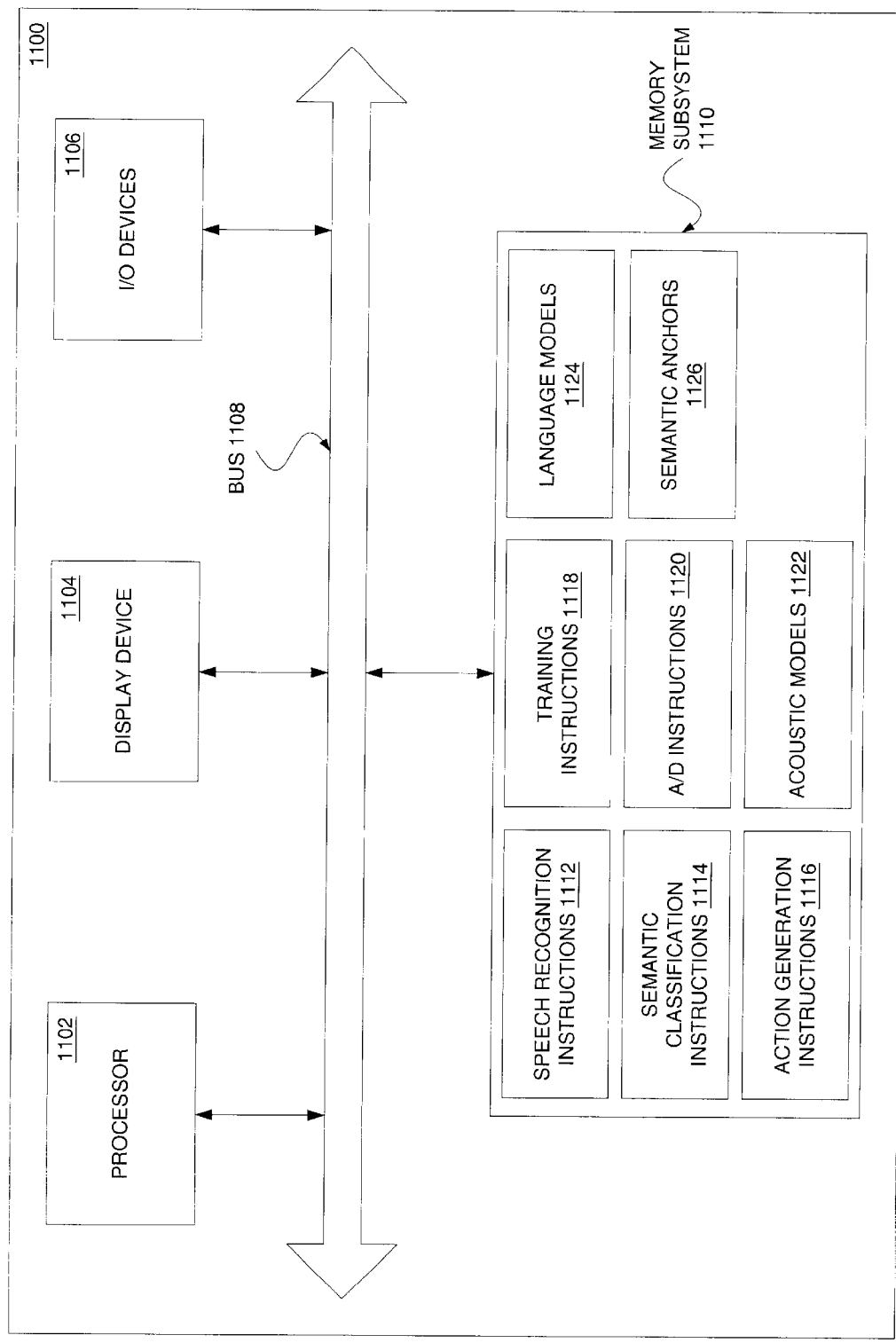
FIG. 11 is a diagram of one embodiment of a computer system suitable for use with one embodiment of the present invention.

FIG. 11 illustrates one embodiment of a computing device suitable for use with one embodiment the present invention. According to one implementation, the voice command and control system 300 of FIG. 3 is a hardware system 1100 of FIG. 11. In the illustrated embodiment of FIG. 1, system 1100 includes processor 1102, display device 1104, and input/output (I/O) devices 1106, coupled to each other via a bus 1108. Additionally, a memory subsystem 1110, which can include one or more of cache memories, system memory (RAM), and nonvolatile storage devices (e.g., magnetic or optical disks) is also coupled to bus 1108 for storage of instructions and data for use by processor 1102. I/O devices

1106 represent a broad range of input and output devices, including keyboards, cursor control devices (e.g., a trackpad or mouse), microphones, speakers, network or telephone communication interfaces, printers, etc. Hardware system 1100 also includes well-known audio processing hardware and/or software to transform analog voice data to a digital form which can be processed by system 1100.

These elements 1102–1110 perform their conventional functions known in the art. Collectively, these elements are intended to represent a broad category of hardware systems, including but not limited to general purpose computer systems based on the PowerPC® processor family of processors available from Motorola, Inc. of Schaumburg, Ill., or the Pentium® processor family of processors available from Intel Corporation of Santa Clara, Calif.

It is to be appreciated that various components of hardware system 1100 may be re-arranged, and that certain implementations of the present invention may not require nor include all of the above components. For example, a display device may not be included in system 1100. Additionally, multiple buses (e.g., a standard I/O bus and a high performance I/O bus) may be included in system 1100. Furthermore, additional components may be included in system 1100, such as additional processors (e.g., a digital signal processor), storage devices, memories, network/communication interfaces, etc.

In the illustrated embodiment of FIG. 11, the method and apparatus for command recognition using data driven semantic inference according to the present invention as discussed above is implemented as a series of software routines run by hardware system 1100 of FIG. 11. These software routines comprise a plurality or series of instructions to be executed by a processor in a hardware system, such as processor 1102 of FIG. 11. Initially, the series of instructions are stored on a storage device of memory subsystem 1110. It is to be appreciated that the series of instructions can be stored using any conventional storage medium, such as a diskette, CD-ROM, magnetic tape, DVD, RAM, ROM, Flash memory, etc. It is also to be appreciated that the series of instructions need not be stored locally, and could be received from a remote storage device, such as a server on a network, via a network/communication interface. The instructions are copied from the storage device, such as mass storage, into system memory and then accessed and executed by processor 1102. In one implementation, these software routines are written in the C++ programming language. It is to be appreciated, however, that these routines may be implemented in any of a wide variety of programming languages.

These software routines are illustrated in memory subsystem 1110 as speech recognition instructions 1112, semantic classification instructions 1114, action generation instructions 1116, and training instructions 1118. Also illustrated are analog to digital (A/D) transformation instructions 1120, acoustic model(s) 1122, language model(s) 1124, and semantic anchors 1126.

In alternate embodiments, the present invention is implemented in discrete hardware or firmware. For example, one or more application specific integrated circuits (ASICs) could be programmed with the above described functions of the present invention. By way of another example, the speech recognition unit 304, semantic classification unit 312, and action generation unit 318 of FIG. 3 could be implemented in one or more ASICs of an additional circuit board for insertion into the hardware system 1100 of FIG. 11.

In the discussions above, the present invention is described with reference to voice recognition systems. It is to be appreciated, however, that alternate embodiments of the present invention can be used with other types of pattern recognition systems, such as visual rather than audio pattern recognition, handwriting recognition systems (e.g., optical character recognition (OCR)), etc.

It is to be appreciated that the command recognition system of the present invention can be employed in any of a wide variety of manners. By way of example, the command recognition system could be used in conventional personal computers, security systems, home entertainment or automation systems, etc.

Therefore, a command recognition using data-driven semantic inference has been described. An audio input is provided to a speech recognizer that identifies the words in the input. These recognized words are then provided to a semantic classifier that classifies the input as corresponding to a particular command. This classification process is advantageously based on a data-driven semantic representation of the input rather than on a grammar-based approach. The appropriate action, based on the particular command, can then be generated. The data-driven semantic representation of the present invention advantageously allows the present invention to adapt to and accurately identify different command wordings.

Thus, a method and apparatus to use semantic inference with a speech recognition system using a context-free grammar has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A machine-implemented method for speech recognition comprising:

recognizing at least one spoken word;

processing said spoken word using a context-free grammar;

deriving an output from said context-free grammar; and translating said output into a predetermined command, wherein said translating comprises semantically inferring said predetermined command from said output.

2. The method of claim 1 further comprising performing an action corresponding to said predetermined command.

3. The method of claim 1 wherein said predetermined command is a semantic anchor.

4. The method of claim 1 wherein said output is a string of recognized words.

5. The method of claim 1 further comprising mapping said output to a vector space.

6. The method of claim 5 wherein said vector space is derived from training data.

7. The method of claim 5 further comprising determining at least one distance within said vector space between said output and a plurality of predetermined commands.

8. The method of claim 7 further comprising selecting the predetermined command that is closest in distance within said vector space to said output.

9. The method of claim 1 wherein said context-free grammar is an extended context-free grammar.

10. The method of claim 1 wherein:

said output comprises a plurality of words; and selecting said predetermined command is not affected by the order of said words within said output.

11. A machine-readable medium having machine-executable instructions to cause a machine to perform a method comprising:

recognizing at least one spoken word;

processing said spoken word using a context-free grammar;

deriving an output from said context-free grammar; and translating said output into a predetermined command, wherein said translating comprises semantically inferring said predetermined command from said output.

12. The machine-readable medium of claim 11 wherein the machine-executable instructions cause the machine to perform a method further comprising performing an action corresponding to said predetermined command.

13. The machine-readable medium of claim 11 wherein the machine-executable instructions cause the machine to perform a method wherein said predetermined command is a semantic anchor.

14. The machine-readable medium of claim 11 wherein the machine-executable instructions cause the machine to perform a method wherein said output is a string of recognized words.

15. The machine-readable medium of claim 11 wherein the machine-executable instructions cause the machine to perform a method further comprising mapping said output to a vector space.

16. The machine-readable medium of claim 15 wherein the machine-executable instructions cause the machine to perform a method wherein said vector space is derived from training data.

17. The machine-readable medium of claim 15 wherein the machine-executable instructions cause the machine to perform a method further comprising determining at least one distance within said vector space between said output and a plurality of predetermined commands.

18. The machine-readable medium of claim 17 wherein the machine-executable instructions cause the machine to perform a method further comprising selecting the predetermined command that is closest in distance within said vector space to said output.

19. The machine-readable medium of claim 11 wherein the machine-executable instructions cause the machine to perform a method wherein said context-free grammar is an extended context-free grammar.

20. The machine-readable medium of claim 11 wherein the machine-executable instructions cause the machine to perform a method wherein:

said output comprises a plurality of words; and selecting said predetermined command is not affected by the order of said words within said output.

21. A machine-readable medium having machine-executable instructions to cause a machine to perform a method comprising:

recognizing at least one spoken word;

processing said spoken word using a context-free grammar;

deriving an output from said context-free grammar; and converting said output to at least one predetermined command using semantic inference.

22. A machine comprising:

a processing unit;

a memory unit coupled to said processing unit by a system bus;

at least one machine-readable medium coupled to said processing unit by said system bus;

a speech recognition unit stored in said machine-readable medium;

a context-free grammar stored in said machine-readable medium; and a semantic inference engine stored in said machine-readable medium.

23. The machine of claim 22 wherein said speech recognition unit comprises instructions causing said processing unit to recognize at least one spoken word.

24. The machine of claim 23 wherein said context-free grammar comprises instructions causing said processing unit to process said spoken word.

25. The machine of claim 24 wherein said context-free grammar comprises instructions causing said processing unit to derive an output.

26. The machine of claim 25 wherein said output is a string of recognized words.

27. The machine of claim 25 wherein said semantic inference engine comprises instructions causing said processing unit to translate said output into a predetermined command.

28. The machine of claim 27 wherein said processor performs an action corresponding to said predetermined command.

29. The machine of claim 27 wherein said semantic inference engine further comprises instructions causing said processing unit to map said output to a vector space.

30. The machine of claim 29 wherein said vector space is derived from training data.

31. The machine of claim 29 wherein said semantic inference engine further comprises instructions causing said processing unit to determine at least one distance within said vector space between said output and a plurality of predetermined commands.

32. The machine of claim 29 wherein said semantic inference engine further comprises instructions causing said processing unit to select the predetermined command that is closest in distance within said vector space to said output.

33. The machine of claim 27 wherein:

said output comprises a plurality of words; and said predetermined command is not affected by the order of said words within output.

34. The machine of claim 22 wherein said context-free grammar is an extended context-free grammar.

35. A computerized system comprising:

means for recognizing at least one spoken word;

means for processing said spoken word using a context-free grammer;

means for deriving an output from said context-free grammer corresponding to said spoken word; and means for converting said output to at least one predetermined command using semantic inference.

36. The system of claim 35 further comprising means for executing an action corresponding to a predetermined command.

* * * * *